United States Patent [19]

Nagano et al.

[11] Patent Number: 5,024,184
[45] Date of Patent: Jun. 18, 1991

[54] DIRECT FUEL INJECTION INTERNAL COMBUSTION ENGINE

[75] Inventors: Susumu Nagano; Hiromitsu Kawazoe; Katsuyuki Ohsawa, all of Aichi, Japan

[73] Assignee: Kabushiki Kaisha Toyota Chuo Kenkyusho, Aichi, Japan

[21] Appl. No.: 455,160

[22] Filed: Dec. 22, 1989

[30] Foreign Application Priority Data

Dec. 26, 1988 [JP] Japan ............................ 63-168558[U]

[51] Int. Cl.$^5$ .............................................. F02B 75/04
[52] U.S. Cl. ................................... 123/48 R; 123/298
[58] Field of Search ............. 123/48 R, 48 A, 48 AA, 123/48 D, 297, 298

[56] References Cited

FOREIGN PATENT DOCUMENTS 2537221 8/1975 Fed. Rep. of Germany .... 123/48 R
1107917 1/1956 France ................................. 123/298

Primary Examiner—Noah P. Kamen
Attorney, Agent, or Firm—Berman, Aisenberg & Platt

[57] ABSTRACT

A direct fuel injection internal combustion engine comprises an auxiliary piston in an auxiliary cylinder for modulating sharp pressure rises in the combustion chamber. The main piston has a cavity into which injected fuel is directed. The fuel injection stream and the output from the auxiliary cylinder intersect.

12 Claims, 5 Drawing Sheets

DIRECT FUEL INJECTION INTERNAL COMBUSTION ENGINE

BACKGROUND OF THE INVENTION

1. Field of the Invention

The present invention relates to the purification of exhaust gases emitted from, the improvement of an output of, and a reduction in the level of combustion noise generated in, a direct fuel injection internal combustion engine.

2. Description of the Related Art

In a direct fuel injection internal combustion engine, soot is produced in a combustion process particularly during medium- and high-load running, and this soot together with exhaust gases is emitted to the atmosphere and constitutes one of the causes of air pollution. To control the production of such soot, an internal combustion engine of this type (Japanese Utility Model Laid-Open No. 193123/1987) has hitherto been proposed in which an air jet is caused to collide against fuel or an air jet is injected into a combustion chamber during a latter stage of combustion. The internal combustion engine of the aforementioned type comprises an air chamber formed by an auxiliary cylinder and an auxiliary piston; an air injection passage communicating with the air chamber and a combustion chamber; an air intake passage communicating with the air chamber and the combustion chamber; and an auxiliary piston controlling means which is rotatively coupled with a crank and is adapted to move the auxiliary piston at a predetermined timing such that the communication between the air intake passage and the air chamber is canceled and the air inside the air chamber is compressed so as to inject air into the compression chamber. As such, the structure of the auxiliary piston controlling means is complicated, and, inevitably, an increase in the loss of driving power results and a head portion of the internal combustion engine becomes large in size. In addition, the combustion at its early stage is accompanied by a rapid pressure rise, as shown by the broken line in FIG. 2, constituting a cause of combustion noise, and high pressure and high temperature of the combustion chamber result in the emissions of $NO_x$.

As another prior art, an arrangement is known which is aimed at obtaining a fixed compression pressure for an internal combustion engine (Japanese Patent Laid-Open No. 92424/1974). This arrangement is such that, in an extensive range of load fluctuations of the internal combustion engine, a pressure regulating piston during a low load is actuated and held in such a manner as to increase the compression pressure, and the pressure regulating piston during a high load is actuated and held in a position for lowering the compression pressure. Consequently, since, during the running of the engine when the load is fixed, the pressure regulating piston is fixed in a position determined by the combustion pressure by means of oil located in its rear so as not to move, it is impossible to obtain an effective emission of exhaust gases from a pressure adjusting chamber to the combustion chamber.

SUMMARY OF THE INVENTION

Accordingly, an object of the present invention is to provide a direct fuel injection internal combustion engine and which, with a simple structure and small energy losses, is capable of causing effective air jets to be produced in a combustion chamber and of reducing amounts of $NO_x$ and soot emitted and the level of combustion noise, thereby overcoming the above-described drawbacks of the conventional art including its complicated structure, energy losses, and noneffective air jets.

To this end, in accordance with the present invention, there is provided a direct fuel injection internal combustion engine, comprising: a combustion chamber formed by a cylinder, a cylinder head opposed to the cylinder, and a piston slidably inserted in the cylinder; a piston cavity provided in the combustion chamber; a fuel injector secured in the cylinder head and adapted to inject and supply fuel into the piston cavity; an air chamber defined by an auxiliary cylinder formed in the cylinder head in proximity to the piston cavity and by an auxiliary piston inserted in the auxiliary cylinder; a communicating passage which allows the air chamber and the combustion chamber to communicate with each other and is oriented toward the piston cavity; and a spring which is adapted to urge the auxiliary piston in a direction of reducing the volume of the air chamber and which, during a pressure rise of the combustion chamber, is adapted to increase the volume of the air chamber and move the auxiliary piston in a direction to modurate a sharp pressure rise of the combustion chamber, and which, during a pressure drop of the combustion chamber, is adapted to decrease the volume of the air chamber and move the auxiliary piston in a direction of jetting air through the communicating passage; whereby the sharp pressure rise of the combustion chamber is modulated, and a turbulence is imparted to the combustion gas in the combustion chamber during an intermediate and ensuing period of combustion (diffusive combustion period).

In Accordance with the above-described arrangement, as air which has been newly sucked into the combustion chamber is compressed by the compressing action of the main piston with a resultant rise in the pressure, air passes from the combustion chamber to the air chamber, so that the internal pressure of the air chamber rises. If the internal pressure of the air chamber rises and overcomes a pressing force of the auxiliary piston, or if, upon ignition after fuel injection into the combustion chamber, the internal pressure of the combustion chamber rises due to sudden combustion during its early stage, and the internal pressure of the air chamber resultantly rises and overcomes the pressing force of the auxiliary piston, then the auxiliary piston moves, and the volume of the air chamber increases, with the result that high-pressure air is accumulated in the air chamber. Subsequently, in an expansion process, the main piston is lowered, and the internal pressure of the combustion chamber drops at the intermediate and final stages of combustion during which mild combustion takes place. As a result, the high-pressure air accumulated in the air chamber spurts into the combustion chamber by the pressing force of the spring, thereby forming an air flow inside the combustion chamber accompanied by a strong turbulence.

As described above, in accordance with the present invention, since the auxiliary piston moves at the time of high pressure in the initial stage of combustion, the volume of the air chamber increases at that time, resulting in a temporary and instantaneous drop in a compression ratio. Consequently, a sharp rise in the pressure inside the combustion chamber is mitigated, and the average combustion temperature in the combustion chamber is lowered, thereby making it possible to reduce the production of NO$_x$ in the initial stage of combustion.

In addition, in accordance with the present invention, a flow and a turbulence are caused to take place which are different from a swirl flow formed in the combustion chamber during a suction stroke by means of the gas spurting from the air chamber at the intermediate and final stages of combustion during which mild combustion takes place. This accelerates the oxidation of soot and makes it possible to increase an air utilization rate and decrease the amount of soot emitted.

In addition, when the period of fuel injection is long during medium- and high-load running, the fuel injected during the intermediate stage of combustion is scattered and converted into fine particles by means of the gas spurting from the air chamber, with the result that an over-rich fuel region is diminished, and the air utilization rate is enhanced.

Furthermore, since the combustion during the final stage of combustion is activated, it is possible to shorten the combustion period and delay the timing of fuel injection, thereby further reducing the production of NO$_x$.

The above and other objects, features and advantages of the present invention will become more apparent from the following description when taken in conjunction with the accompanying drawings in which preferred embodiments of the invention are shown by way of illustrative example.

DESCRIPTION OF THE PREFERRED EMBODIMENTS

Figure 1:
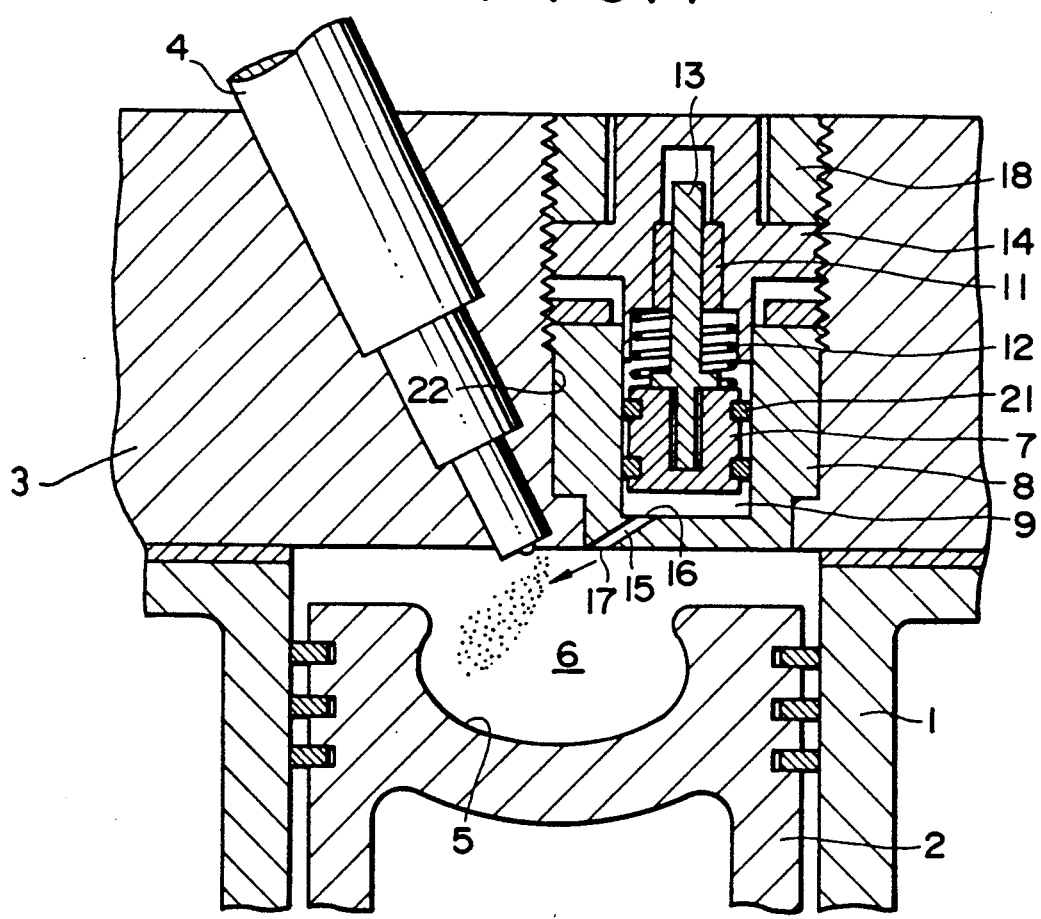
FIG. 1 is a cross sectional view of a first embodiment of the present invention which is applied to a compression ignition-type internal combustion engine.

FIG. 1 illustrates a first embodiment of a direct fuel injection internal combustion engine which is applied to a compression ignition-type internal combustion engine in accordance with the present invention. A main piston 2 is reciprocatably disposed in a cylinder block 1. A cylinder head 3 having a flat inner wall surface is secured to the top of the cylinder block 1. The cylinder head 3 is provided with a fuel injector 4.

A piston cavity 5 is formed in the top surface of the main piston 2, and a combustion chamber 6 is mainly formed in the piston cavity 5. The fuel injector 4 is disposed facing the interior of the piston cavity 5, and fuel is injected from the fuel injector 4 into the combustion chamber 6. Although not shown, an intake valve and an exhaust valve are disposed on the inner wall surface of the cylinder head 3.

A stepped through-hole 22 is provided in the cylinder head 3 at a position substantially opposing the piston cavity 5. An auxiliary piston 7 is slidably disposed in an auxiliary cylinder 8 which is threadingly inserted in the stepped through hole 22. The auxiliary cylinder 8 is formed of a cylindrical member with a bottom and with a reduced-diameter end portion. Two annular grooves are provided in a side surface of the auxiliary piston 7, two piston rings 21 being provided in the respective grooves for maintaining gastightness. In addition, an air chamber 9 formed by the auxiliary cylinder 8 and the auxiliary piston 7 communicates with the combustion chamber 6 through a communicating passage 15 which is always open. The communicating passage 15 has an inlet port 16 located at a lower surface of the air chamber 9 and an outlet port 17 at an upper portion of the combustion chamber 6, the direction of the communicating passage 15 being oriented toward the fuel injected from the fuel injector 4.

A sleeve 14 being cross-shaped in the vertical section is meshed with the through-hole 22 on an upper portion of the auxiliary cylinder 8. The sleeve 14 is arranged such that its distal end portion has a large inside diameter for accommodating a spring 12 therein, while its proximal end portion has a stepped portion for retaining the spring 12 and has a small inside diameter for securing a guide 11, and an upper portion thereof is provided with a flange having a large outside diameter. A stopper 18 is meshed with the through-hole 22, and the sleeve 14 is secured to the cylinder head 3 by means of this stopper 18.

An upper end of a stem 13 extends through the guide 11, and its distal end portion is threadingly secured to the auxiliary piston 7. The auxiliary piston 7 is guided along an axis of the auxiliary cylinder 8 by means of the stem 13 and the guide 11. In addition, the auxiliarY piston 7 is urged downwardly as viewed in the drawing by means of the spring 12, and the capacity inside the air chamber 9 is set to substantially zero until the gas pressure inside the air chamber 9 overcomes the pressing force of the spring 12. This pressing force is adjusted by the initial length of the spring 12, while this length is adjusted by an axial position of the sleeve 14 retaining the spring 12.

The operation of this embodiment will be described hereinunder.

The air which is newly sucked into the combustion chamber 6, as the main piston 2 rises, is compressed by the main piston 2. In the meantime, although the volume of the air chamber 9 is substantially zero due to the pressing force of the spring 12, the volume of the air chamber 9 increases slightly with an increase in the pressure inside the combustion chamber 6.

Subsequently, fuel is injected from the fuel injector 4 toward the piston cavity 5, and the air-fuel mixture is subjected to compression and ignition and is burned.

Figure 2:
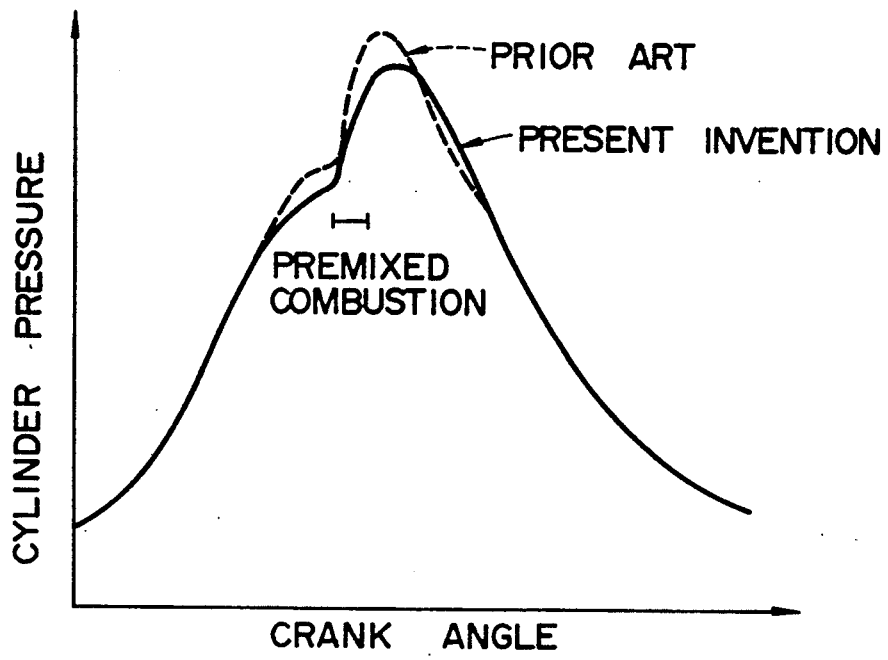
FIG. 2 is a diagram in which a comparison is made in the cylinder pressure histories with a change in a crank angle between the present invention and the prior art.
Figure 3:
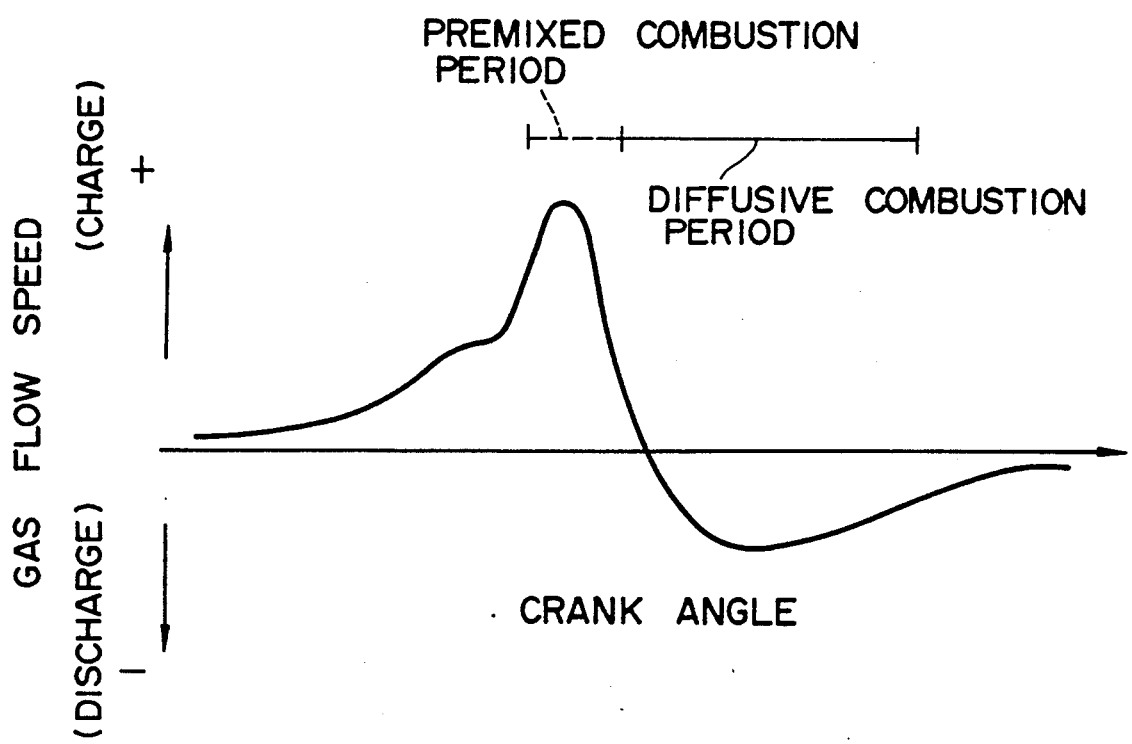
FIG. 3 is a diagram of the gas flow speed inside a communicating passage in accordance with the present invention.

At this time, as shown in FIG. 2, in a premixed fuel combustion duration, the pressure within the air chamber 9 increases with the pressure within the combustion chamber 6, which in turn causes the auxiliary piston 7 to overcome the pressing force of the spring 12 and move upward, allowing the gas inside the combustion chamber 6 to flow into the air chamber 9, as shown in FIG. 3. At this juncture, the outlet port 17 of the communicating passage 15 is remote from the position where a fuel spray is present, an increase in the volume of the air chamber 9 is carried out gradually through a balance between the combustion pressure inside the combustion chamber 6 and the pressing force of the spring 12, and the maximum volume of the air chamber 9 is very small at about 0.1% to 1.0% of the cylinder stroke volume, so that the upward movement of the auxiliary piston 7 is not very large, and most of the gas flowing from the outlet port 17 of the communicating passage 15 into the air chamber 9 is not the combustion gas or the air-fuel mixture but the newly introduced air. Furthermore, an increase in the air chamber volume with an increase in the pressure inside the combustion chamber controls a rapid rise in the pressure inside the combustion chamber. Thus, since the pressure rise can be made gradual as compared with a conventional engine, as shown in FIG. 2, it is possible to reduce the level of combustion noise and prevent an increase in the amount of thermal $NO_x$ resulting from an increased temperature of the combustion gas caused by the pressure rise.

Immediately after the top dead center of compression, combustion becomes diffusive combustion, and during this period soot is generated in a portion of the gas which lacks oxygen. At this stage, the internal pressure of the combustion chamber 6 begins to drop to a level lower than the internal pressure of the air chamber 9. Consequently, the auxiliary piston 7 begins to descend as viewed in FIG. 1 due to the pressing force of the spring 12 located in its rear, and the efflux of gas during a diffusive combustion period begins, as shown in FIG. 3.

As a result, the auxiliary piston 7 jets air through the communicating passage 15 toward the fuel spray inside the piston cavity 5 while compressing the air inside the air chamber 9, supplies oxygen to the portion which lacks oxygen, and causes a turbulent flow to take place in the piston cavity 5 due to this air jet. Hence, the mixing of ambient air, unburnt fuel, and the incomplete combustion gas containing a large amount of soot is improved, and the oxidation of soot is accelerated remarkably, so that the amount of soot emitted from the combustion chamber 6 is reduced.

By virtue of the above-described action, it is possible to effect combustion in which the amount of exhaust emissions including soot and $NO_x$ is very small. Accordingly, it is also possible to realize an increase in a maximum output within an allowable emission limit of soot. In addition, an inexpensive low-pressure fuel injector may be used as a fuel injector, so that it is possible to realize a compact direct fuel injection internal combustion engine which can be fabricated at low cost as a whole, emits a small amount of soot, and has a high output. Furthermore, since no driving means from the outside is required for driving the auxiliary piston, the structure is simple, and losses in driving power are also small. Additionally, it is possible to decrease a pressure rise during a premix combustion, which constitutes a main cause of combustion noise, thereby reducing the level of combustion noise.

It should be noted that in the present invention the spring 12 is not restricted to a coil spring as in the case of the embodiments, and a leaf spring, a disc spring, or the like may be used, or another type of elastic member may be used.

Figure 4:
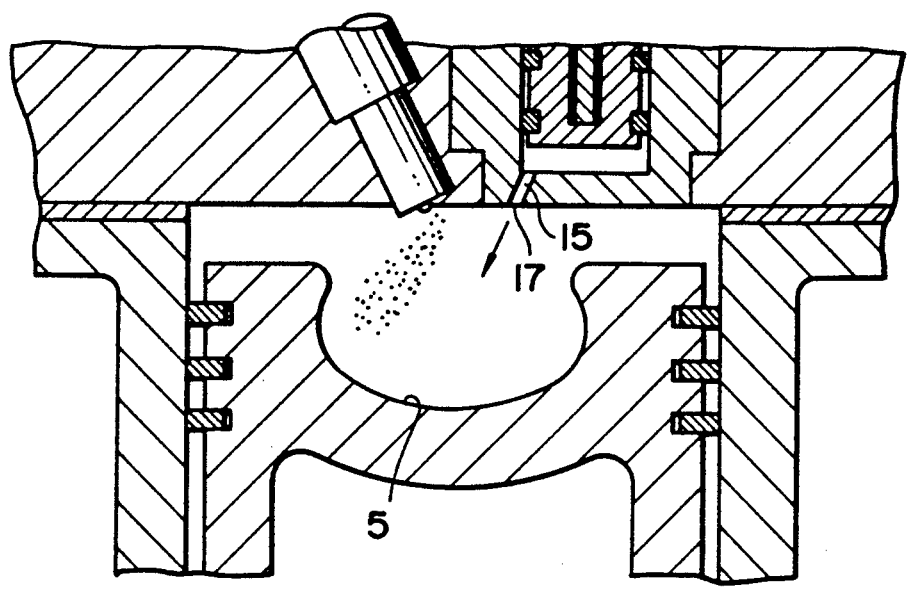
FIG. 4 is a cross-sectional view illustrating a second embodiment of the present invention.

FIG. 4 shows a second embodiment of the present invention. As illustrated, the outlet port 17 of the communicating passage 15 in the first embodiment may be made to be open toward the center of the piston cavity 5. As a result, it is possible to jet air to a central portion of the combustion chamber, i.e., which is the center of rotation of a swirl, where a flame is relatively difficult to enter, with the result that a turbulence is imparted thereto, thereby accelerating the mixing of the unutilized air and the flame and controlling the generation of soot. This second embodiment also demonstrates other advantages that are similar to those of the first embodiment. Although the above-described first and second embodiments show the examples having one communicating passage, a plurality of communicating passages may be provided.

Figure 5:
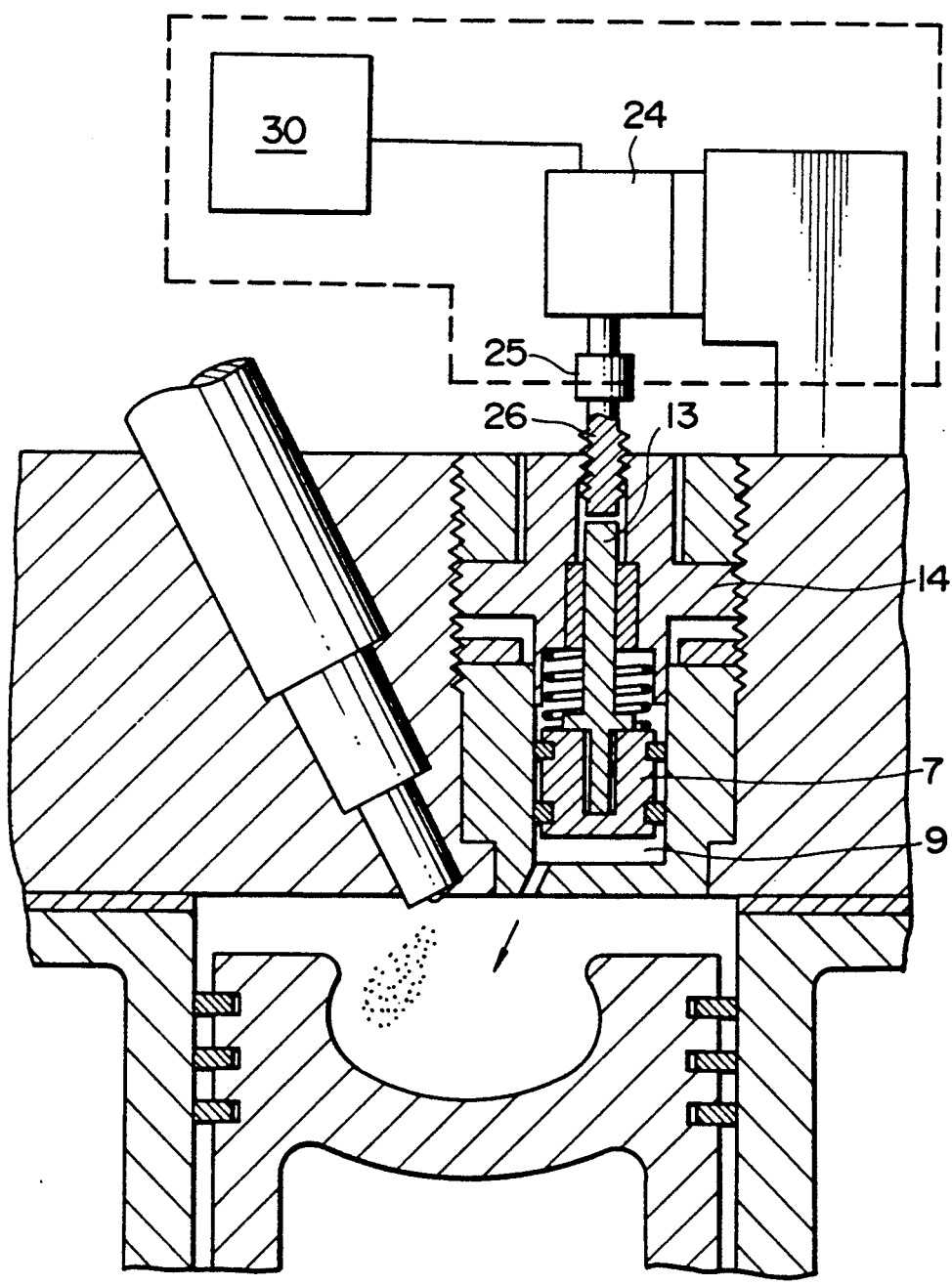
FIG. 5 is a cross-sectional view illustrating a third embodiment of the present invention.
Figure 6:
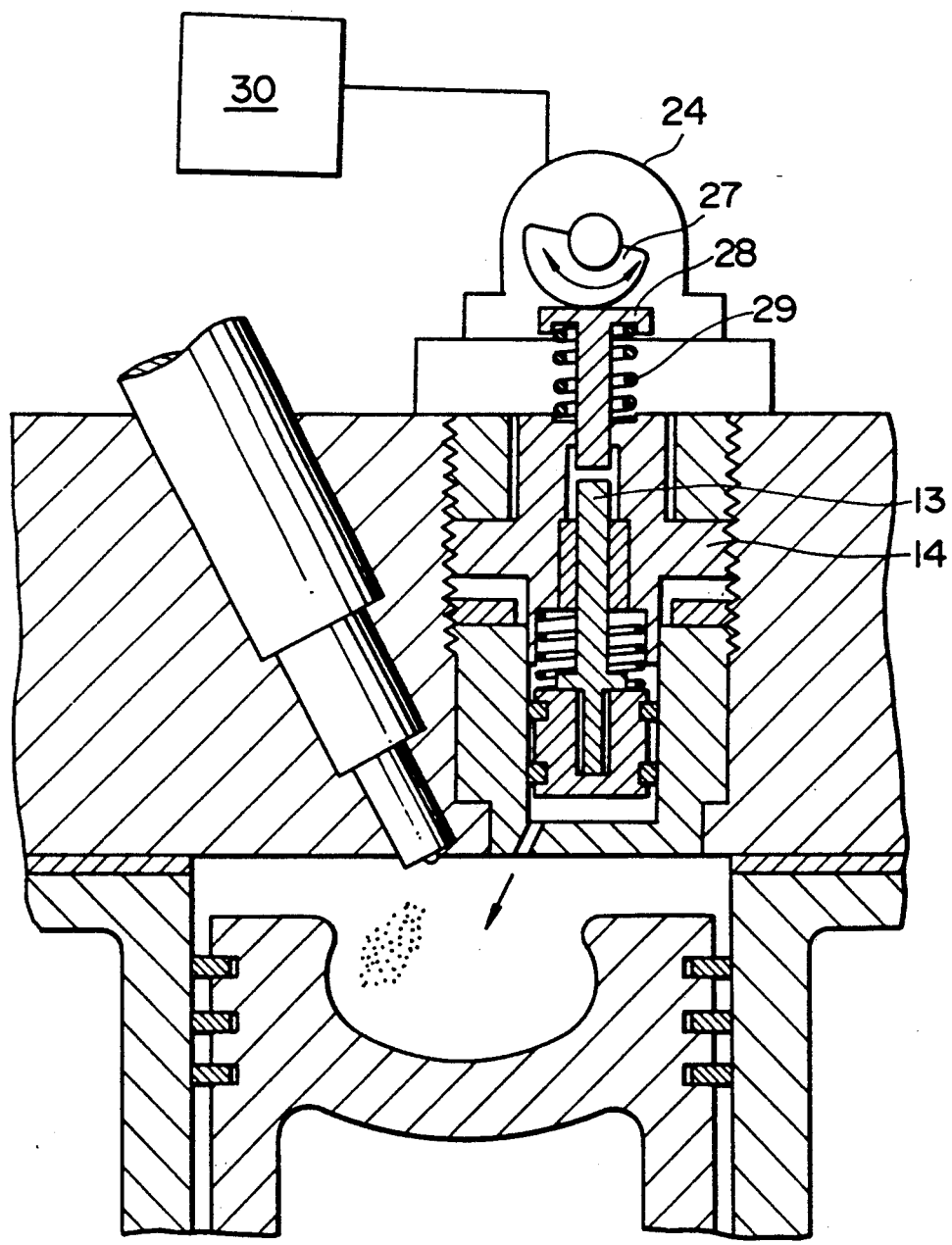
FIG. 6 is a cross-sectional view illustrating the third embodiment of the present invention.

FIG. 5 illustrates a third embodiment of the present invention. As illustrated, an adjusting screw 26 for adjusting the amount of stroke of the stem 13 is provided extending through and above a portion of the sleeve 14 and above the stem 13 in accordance with the first and second embodiments. An arrangement is such that a stroke controlling section for controlling the stroke of the stem is provided wherein the adjusting screw 26 is rotatively driven by using a stepping motor 24 and a controller 30 for controlling the stepping motor 24 in correspondence with a running condition of the engine via a coupling 25 so as to adjust the amount of tightening of the adjusting screw. Consequently, it is possible to vary the maximum amount of the stroke of the auxiliary piston 7, so that the maximum volume of the air chamber 9 is suited to an operating condition. In addition to the above-described advantage, this third embodiment also displays other advantages similar to those of the first and second embodiments. Moreover, the adjustment of the amount of stroke in this embodiment may be effected by a stroke controlling section wherein, as shown in FIG. 6, an adjusting member 28 inserted slidably into an upper portion of the sleeve 14 and a spring 29 for urging the adjusting member 28 upwardly as viewed in the drawing are provided instead of the adjusting screw, and a cam 27 which is rotatively driven by the stepping motor 24 and whose fixing angle is thereby adjusted.

Figure 7:
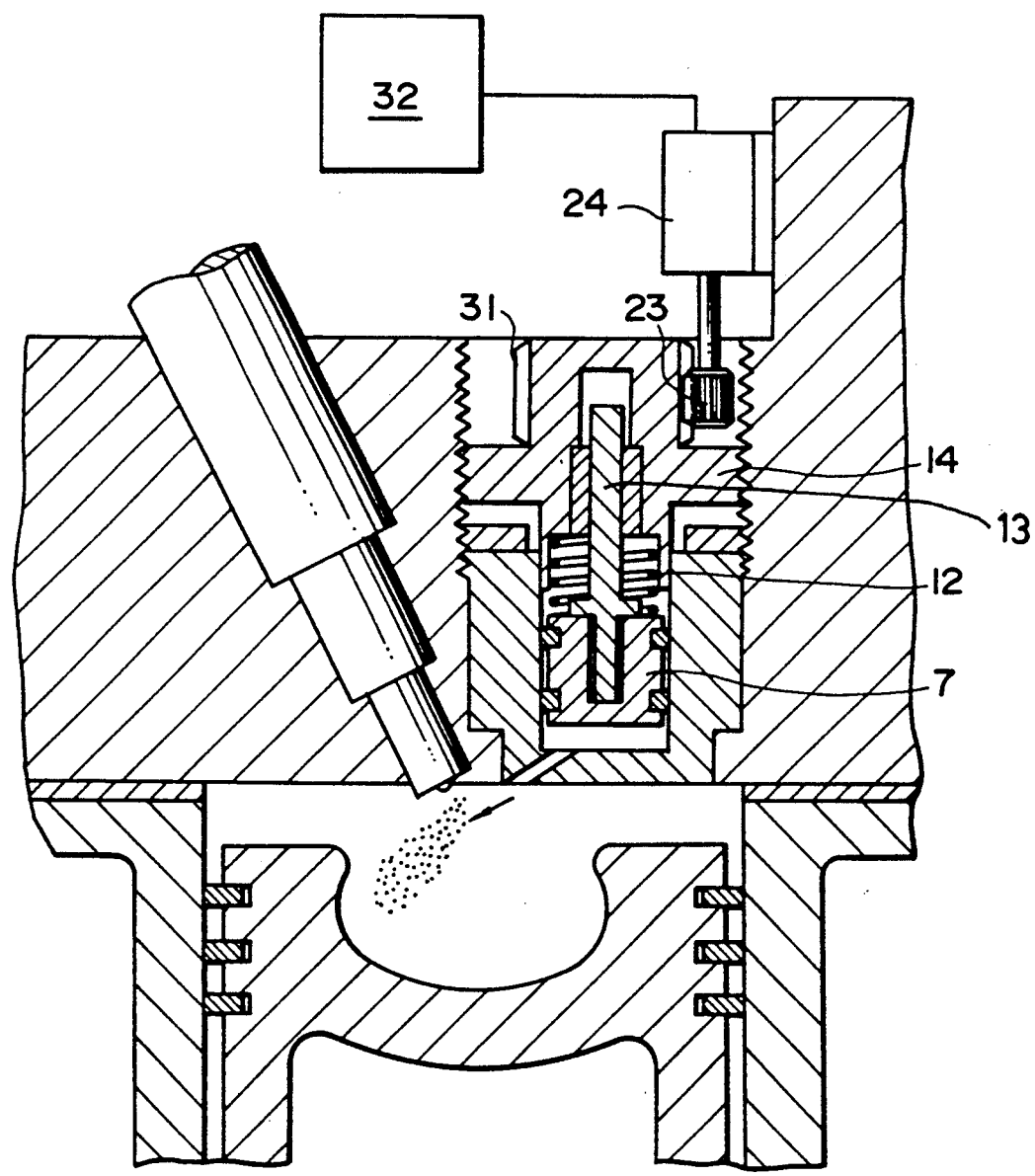
FIG. 7 is a cross-sectional view illustrating a fourth embodiment of the present invention.

FIG. 7 illustrates a fourth embodiment of the present invention. This embodiment is characterized in that the sleeve 14 in accordance with the first and second embodiments is made movable in the vertical direction of the stem 13. In the third embodiment, the constituting elements (controller 30, stepping motor 24) surrounded by the dotted line in FIG. 5 may be omitted, and the adjusting screw 26 may be set mannually to adjust the amount of the stroke. This embodiment is also characterized by comprising a gear 31 provided along an upper side surface of the sleeve 14; a stepping motor 24 for rotatively driving the gear 31 via a gear 23; and a controller 32 for controlling the stepping motor in accordance with a running condition of the engine. Hence, in accordance with this fourth embodiment, as the sleeve 14 is moved vertically so as to vary the initial length of the spring 12, an initial set force of the spring 12 is changed, thereby controlling the pressing force of the spring exerted on the auxiliary piston 7 such that the operating timing of the auxiliary piston and the capacity of the air chamber 9 can be made suitable to the operating condition. In addition to the aforementioned advantages, this fourth embodiment also exhibits other advantages that are similar to those of the first and second embodiments.

What is claimed is:

1. A direct fuel injection internal combustion engine, comprising:
    a combustion chamber formed by a cylinder, a cylinder head opposed to said cylinder, and a piston slidably inserted in said cylinder;

a piston cavity provided in said combustion chamber;

a fuel injector secured in said cylinder head and adapted to inject and supply fuel into said piston cavity;

an air chamber defined by an auxiliary cylinder formed in said cylinder head in proximity to said piston cavity and by an auxiliary piston inserted in said auxiliary cylinder, the maximum volume of said air chamber being about 0.1% to about 1.0% of the cylinder stroke volume;

a communicating passage which allows said air chamber and said combustion chamber to communicate with each other and is oriented toward said piston cavity; and a spring which is adapted to urge said auxiliary piston in a direction of reducing the volume of said air chamber and which, during a pressure rise of said combustion chamber, is adapted to increase said volume of said air chamber and move said auxiliary piston in the direction of modulating a sharp pressure rise of said combustion chamber, and which, during a pressure drop of said combustion chamber, is adapted to decrease said volume of said air chamber and move said auxiliary piston in a direction of jetting air through said communicating passage;

whereby said sharp pressure rise of said combustion chamber is modulated, and a turbulence is imparted to the combustion gas in said combustion chamber during a diffusive combustion.

2. A direct fuel injection internal combustion engine according to claim 1, wherein said communicating passage has an inlet port located at a lower surface of said air chamber and an outlet port at an upper portion of said combustion chamber, the center axis of said communicating passage and the center axis of said injection portion of said fuel injector being substantially crossed within said combustion chamber at a time of top dead center and the direction of said communicating passage being oriented toward the fuel injected from said fuel injector.

3. A direct fuel injection internal combustion engine according to claim 1, further comprising:

a first spring seat placed on one surface of said auxiliary piston opposite to the surface thereof facing said air chamber, as one of seats for supporting said spring;

a second spring seat placed at the position opposed to said first spring seat, as the other of seats for supporting said spring; and initial length setting means contacting said second spring seat, for setting an initial length of said spring corresponding to a length of said spring when the volume of said air chamber becomes minimum.

4. A direct fuel injection internal combustion engine according to claim 1, wherein the volume of said air chamber is zero under no driving of the combustion engine.

5. A direct fuel injected internal combustion engine comprising:

a combustion chamber formed by a cylinder, a cylinder head opposed to said cylinder, and a piston slidably inserted in said cylinder;

a piston cavity provided in said combustion chamber;

a fuel injector secured in said cylinder head and adapted to inject and supply fuel into said piston cavity;

an air chamber defined by an auxiliary cylinder formed in said cylinder head in proximity to said piston cavity and by an auxiliary piston inserted in said auxiliary cylinder;

a communicating passage which allows said air chamber and said combustion chamber to communicate with each other and is oriented toward said piston cavity; and a spring which is adapted to urge said auxiliary piston in a direction of reducing the volume of said air chamber and which, during a pressure rise of said combustion chamber, is adapted to increase said volume of said air chamber and move said auxiliary piston in the direction of modulating a sharp pressure rise of said combustion chamber, and which, during a pressure drop of said combustion chamber, is adapted to decrease said volume of said air chamber and move said auxiliary piston in a direction of jetting air through said communicating passage;

whereby said sharp pressure rise of said combustion chamber is modulated, and a turbulence is imparted to the combustion gas in said combustion chamber during a diffusive combustion;

wherein said communicating passage has an inlet port located at a lower surface of said air chamber and an outlet port at an upper portion of said combustion chamber, the center axis of said communicating passage and the center axis of said piston cavity being substantially crossed and the direction of said communicating passage being oriented toward the central region of said piston cavity.

6. A direct fuel injection internal combustion engine comprising:

a combustion chamber formed by a cylinder, a cylinder head opposed to said cylinder, and a piston slidably inserted in said cylinder;

a piston cavity provided in said combustion chamber;

a fuel injector secured in said cylinder head and adapted to inject and supply fuel into said piston cavity;

an air chamber defined by an auxiliary cylinder formed in said cylinder head in proximity to said piston cavity and by an auxiliary piston inserted in said auxiliary cylinder;

a communicating passage which allows said air chamber and said combustion chamber to communicate with each other and is oriented toward said piston cavity; and a spring which is adapted to urge said auxiliary piston in a direction of reducing the volume of said air chamber and which, during a pressure rise of said combustion chamber, is adapted to increase said volume of said air chamber and move said auxiliary piston in the direction of modulating a sharp pressure rise of said combustion chamber, and which, during a pressure drop of said combustion chamber, is adapted to decrease said volume of said air chamber and move said auxiliary piston in a direction of jetting air through said communicating passage;

a stem rigidly mounted on one surface of said auxiliary piston opposite to the surface thereof facing said air chamber; and stroke adjusting means located at the position opposed to said stem for controlling a maximum value of the stroke of said stem and at the same time for controlling the stroke of said auxiliary piston;

whereby said sharp pressure rise of said combustion chamber is modulated, and a turbulence is imparted to the combustion gas in said combustion chamber during a diffusive combustion.

7. A direct fuel injection internal combustion engine comprising:
  a combustion chamber formed by a cylinder, a cylinder head opposed to said cylinder, and a piston slidably inserted in said cylinder;
  a piston cavity provided in said combustion chamber;
  a fuel injector secured in said cylinder head and adapted to inject and supply fuel into said piston cavity;
  an air chamber defined by an auxiliary cylinder formed in said cylinder head in proximity to said piston cavity and by an auxiliary piston inserted in said auxiliary cylinder;
  a communicating passage which allows said air chamber and said combustion chamber to communicate with each other and is oriented toward said piston cavity; and
  a spring which is adapted to urge said auxiliary piston in a direction of reducing the volume of said air chamber and which, during a pressure rise of said combustion chamber, is adapted to increase said volume of said air chamber and move said auxiliary piston in the direction of modulating a sharp pressure rise of said combustion chamber, and which, during a pressure drop of said combustion chamber, is adapted to decrease said volume of said air chamber and move said auxiliary piston in a direction of jetting air through said communicating passage;
  stroke adjusting means for controlling a maximum value of the stroke of said auxiliary piston in a direction of increasing the volume of said air chamber; and
  stroke controlling means for controlling said stroke adjusting means in correspondence with a running condition of said engine;
  whereby said sharp pressure rise of said combustion chamber is modulated, and a turbulence is imparted to the combustion gas in said combustion chamber during a diffusive combustion; and
  wherein said communicating passage has an inlet port located at a lower surface of said air chamber and an outlet port at an upper portion of said combustion chamber, the center axis of said communicating passage and the center axis of said injection portion of said fuel injector being substantially crossed and the direction of said communicating passage being oriented toward the fuel injected from said fuel injector.

8. A direct fuel injection internal combustion engine comprising:
  a combustion chamber formed by a cylinder, a cylinder head opposed to said cylinder, and a piston slidably inserted in said cylinder;
  a piston cavity provided in said combustion chamber;
  a fuel injector secured in said cylinder head and adapted to inject and supply fuel into said piston cavity;
  an air chamber defined by an auxiliary cylinder formed in said cylinder head in proximity to said piston cavity and by an auxiliary piston inserted in said auxiliary cylinder;
  a communicating passage which allows said air chamber and said combustion chamber to communicate with each other and is oriented toward said piston cavity;
  a spring which is adapted to urge said auxiliary piston in a direction of reducing the volume of said air chamber and which, during a pressure rise of said combustion chamber, is adapted to increase said volume of said air chamber and move said auxiliary piston in the direction of modulating a sharp pressure rise of said combustion chamber, and which, during a pressure drop of said combustion chamber, is adapted to decrease said volume of said air chamber and move said auxiliary piston in a direction of jetting air through said communicating passage;
  stroke adjusting means for controlling a maximum value of the stroke of said auxiliary piston in a direction of increasing the volume of said air chamber; and
  stroke controlling means for controlling said stroke adjusting means in correspondence with a running condition of said engine;
  whereby said sharp pressure rise of said combustion chamber is modulated, and a turbulence is imparted to the combustion gas in said combustion chamber during a diffusive combustion; and
  wherein said communicating passage has an inlet port located at a lower surface of said air chamber and an outlet port at an upper portion of said combustion chamber, the center axis of said communicating passage and the center axis of said piston cavity being substantially crossed and the direction of said communicating passage being oriented toward the central region of said piston cavity.

9. A direct fuel injection internal combustion engine comprising:
  a combustion chamber formed by a cylinder, a cylinder head opposed to said cylinder, and a piston slidably inserted in said cylinder;
  a piston cavity provided in said combustion chamber;
  a fuel injector secured in said cylinder head and adapted to inject and supply fuel into said piston cavity;
  an air chamber defined by an auxiliary cylinder formed in said cylinder head in proximity to said piston cavity and by an auxiliary piston inserted in said auxiliary cylinder;
  a communicating passage which allows said air chamber and said combustion chamber to communicate with each other and is oriented toward said piston cavity; and
  a spring which is adapted to urge said auxiliary piston in a direction of reducing the volume of said air chamber and which, during a pressure rise of said combustion chamber, is adapted to increase said volume of said air chamber and move said auxiliary piston in the direction of modulating a sharp pressure rise of said combustion chamber, and which, during a pressure drop of said combustion chamber, is adapted to decrease said volume of said air chamber and move said auxiliary piston in a direction of jetting air through said communicating passage;
  initial length setting means for setting an initial length of said spring;
  initial length adjusting means for adjusting said initial length setting means; and initial length controlling means for controlling said initial length adjusting means in correspondence with a running condition of said engine;

whereby said sharp pressure rise of said combustion chamber is modulated, and a turbulence is imparted to the combustion gas in said combustion chamber during a diffusive combustion; and wherein said communicating passage has an inlet port located at a lower surface of said air chamber and an outlet port at an upper portion of said combustion chamber, the center axis of said communicating passage and the center axis of said injection portion of said fuel injector being substantially crossed and the direction of said communicating passage being oriented toward the fuel injected from said fuel injector.

10. A direct fuel injection internal combustion engine according to claim 9, further comprising:

stroke adjusting means for adjusting a maximum value of the stroke of said auxiliary piston; and stroke controlling means for controlling said stroke adjusting means.

11. A direct fuel injection internal combustion engine comprising:

a combustion chamber formed by a cylinder, a cylinder head opposed to said cylinder, and a piston slidably inserted in said cylinder;

a piston cavity provided in said combustion chamber;

a fuel injector secured in said cylinder head and adapted to inject and supply fuel into said piston cavity;

an air chamber defined by an auxiliary cylinder formed in said cylinder head in proximity to said piston cavity and by an auxiliary piston inserted in said auxiliary cylinder;

a communicating passage which allows said air chamber and said combustion chamber to communicate with each other and is oriented toward said piston cavity;

a spring which is adapted to urge said auxiliary piston in a direction of reducing the volume of said air chamber and which, during a pressure rise of said combustion chamber, is adapted to increase said volume of said air chamber and move said auxiliary piston in the direction of modulating a sharp pressure rise of said combustion chamber, and which, during a pressure drop of said combustion chamber, is adapted to decrease said volume of said air chamber and move said auxiliary piston in a direction of jetting air through said communicating passage;

initial length setting means for setting an initial length of said spring;

initial length adjusting means for adjusting said initial length setting means, and initial length controlling means for controlling said initial length adjusting means in correspondence with a running condition of said engine;

whereby said sharp pressure rise of said combustion chamber is modulated, and a turbulence is imparted to the combustion gas in said combustion chamber during a diffusive combustion; and wherein said communicating passage has an inlet port located at a lower surface of said air chamber and an outlet port at an upper portion of said combustion chamber, the center axis of said communicating passage and the center axis of said piston cavity being substantially crossed and the direction of said communicating passage being oriented toward the central region of said piston cavity.

12. A direct fuel injection internal combustion engine according to claim 11, further comprising:

stroke adjusting means for adjusting a maximum value of the stroke of said auxiliary piston; and stroke controlling means for controlling said stroke adjusting means.

* * * * *